(12) United States Patent
Carter et al.

(10) Patent No.: US 7,451,441 B2
(45) Date of Patent: Nov. 11, 2008

(54) AUTONOMOUS ADAPTIVE SOFTWARE LOADING FOR A DATA COLLECTION DEVICE

(75) Inventors: Anthony Carter, Lynnwood, WA (US); Allen White, Snohomish, WA (US); Andrew Harding, Kirkland, WA (US); Drew L. Ritland, Everett, WA (US)

(73) Assignee: Intermec IP Corp., Everett, WA (US)

( * ) Notice: Subject to any disclaimer, the term of this patent is extended or adjusted under 35 U.S.C. 154(b) by 506 days.

(21) Appl. No.: 10/804,820

(22) Filed: Mar. 19, 2004

(65) Prior Publication Data

US 2005/0210466 A1 Sep. 22, 2005

(51) Int. Cl.
*G06F 9/445* (2006.01)
(52) U.S. Cl. ...................................... 717/174
(58) Field of Classification Search ................... 717/174
See application file for complete search history.

(56) References Cited

U.S. PATENT DOCUMENTS

| 6,341,373 B1 * | 1/2002 | Shaw ......................... 717/173 |
| 2005/0102660 A1 * | 5/2005 | Chen et al. .................. 717/168 |

OTHER PUBLICATIONS

Microsoft Corporation, "About Platform Builder," Oct. 8, 2004, retrieved Nov. 16, 2004 from http://msdn.microsoft.com/library/default.asp?url=/library/en-us/wcepb40/html/pboriusingplatformbuilder.asp.

Microsoft Corporation, "How to Configure the Registry to Run an Application at Startup," Oct. 8, 2004, retrieved Nov. 16, 2004 from http://msdn.microsoft.com/library/default.asp?url=/library/en-us/wcepb40/html/pbconHowToAddApplicationToRunAtStartup.asp.
Microsoft Corporation, "How to Use the Command Line to Create, Customize, and Build a Platform," Oct. 8, 2004, retrieved Nov. 16, 2004 from http://msdn.microsoft.com/library/default.asp?url=/library/en-us/wcepb40/html/pbconHowToDevelop-PlatformUsingCommandLine.asp.
Microsoft Corporation, "Pocket PC WCELOAD.EXE," Oct. 29, 2003 retrieved Nov. 2, 2004 from http://msdn.microsoft.com/library/default.asp?url=/library/en-us/amo_ppc/htm/amo_pocket_pc_wceload_exe_skvl.asp.

* cited by examiner

*Primary Examiner*—Wei Y. Zhen
*Assistant Examiner*—Phillip H Nguyen
(74) *Attorney, Agent, or Firm*—Seed IP Law Group PLLC

(57) ABSTRACT

A scalable and adaptive technique determines which particular software features should be installed in a device (such as a data collection device) without rebuilding the operating system of the device. The device stores a product configuration matrix (PCM) that provides identification information, including which software features should be installed in the device. A configuration control file (CCF) is externally stored at any suitable location, such as in a local file system or on a network. The CCF contains product configuration masks, identifications of external locations where software features can be obtained, and identifications of locations within the device where the software feature is to be loaded. During an installation process, the PCM is read from the device and compared with the product configuration mask in the CCF. When there is a match, the software features corresponding to the matching product configuration mask are obtained and loaded into the device.

29 Claims, 4 Drawing Sheets

AUTONOMOUS ADAPTIVE SOFTWARE LOADING FOR A DATA COLLECTION DEVICE

TECHNICAL FIELD

The present disclosure relates generally to software installation, and more particularly but not exclusively, relates to automated techniques to install customized software features into a device, such as a data collection device, without requiring a rebuild of the device's operating system, wherein the software features may be loaded into the device from a wireless network, wired network, local file system, or other location.

BACKGROUND INFORMATION

There are many types of electronic devices. Included among these types of devices are portable electronic devices that have functionalities similar to those of desktop computers. For example, such electronic devices may have a memory, processor, display screen, keyboard, installed software applications, communication components, and so forth. Moreover, such electronic devices may also include an operating system.

In certain situations, electronic devices can be customized differently according to the respective needs of their users. For instance, a group of users may require their electronic devices to have certain software (or hardware) features, while another group of users having the same type of electronic devices may require their electronic devices to have some different (or completely different) software features. This customized configuration of many individual electronic devices can be a tedious and expensive process, particularly in manufacturing situations where "time is money" with regards to mass-producing electronic devices to consumers in a timely manner.

As an example, one technique for customization is to install all possible software features into every electronic device, and then allow consumers to use only the specific software features that they need, while other installed software features remain installed but unused. In effect, this is really not customization of an electronic device, and moreover, installing all possible software features in electronic devices is an inefficient approach.

Additionally, existing techniques for customized configuration (including software installation) involve manual human intervention to configure each electronic device. Manual configuration is tedious and time consuming, and thus ultimately costly.

Various customization products further illustrate these points. For example, some electronic devices use the Windows® CE operating system from Microsoft Corporation of Redmond, Wash. Windows® CE Platform Builder and WCELoad.exe are two products that allow customization of Windows® CE devices. Platform Builder allows for extensive customization of a Windows® CE device before an operating system image has been created, but no customization afterwards. Thus, if subsequent additional customization is needed, the operating system has to be rebuilt.

This approach is inflexible, since it does not allow existing capabilities to be extended. That is, this approach forces manufactures to install all possible software features into an electronic device, and does not allow for other customization changes that were not known ahead of time when the operating system image was created.

In comparison, WCELoad.exe will install cabinet (CAB) files that have been created by parties offering software, but these CAB files must be executed on the electronic device before customization can be performed. Use of WCELoad.exe allows for customization after the operating system image has been created and is running, but some user intervention is required to perform the customization, including verifying that the installed software is operating properly.

BRIEF SUMMARY OF THE INVENTION

One aspect provides a method to install software features into an electronic device. The method includes storing at least one product configuration matrix (PCM) in the electronic device. The PCM including information is representative of at least one software feature that can be installed in the electronic device. The PCM information is read, and compared with information from a configuration control file (CCF). For a match between the PCM information and the CCF information, the method obtains a software feature that corresponds to the match and installs that software feature into the electronic device.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
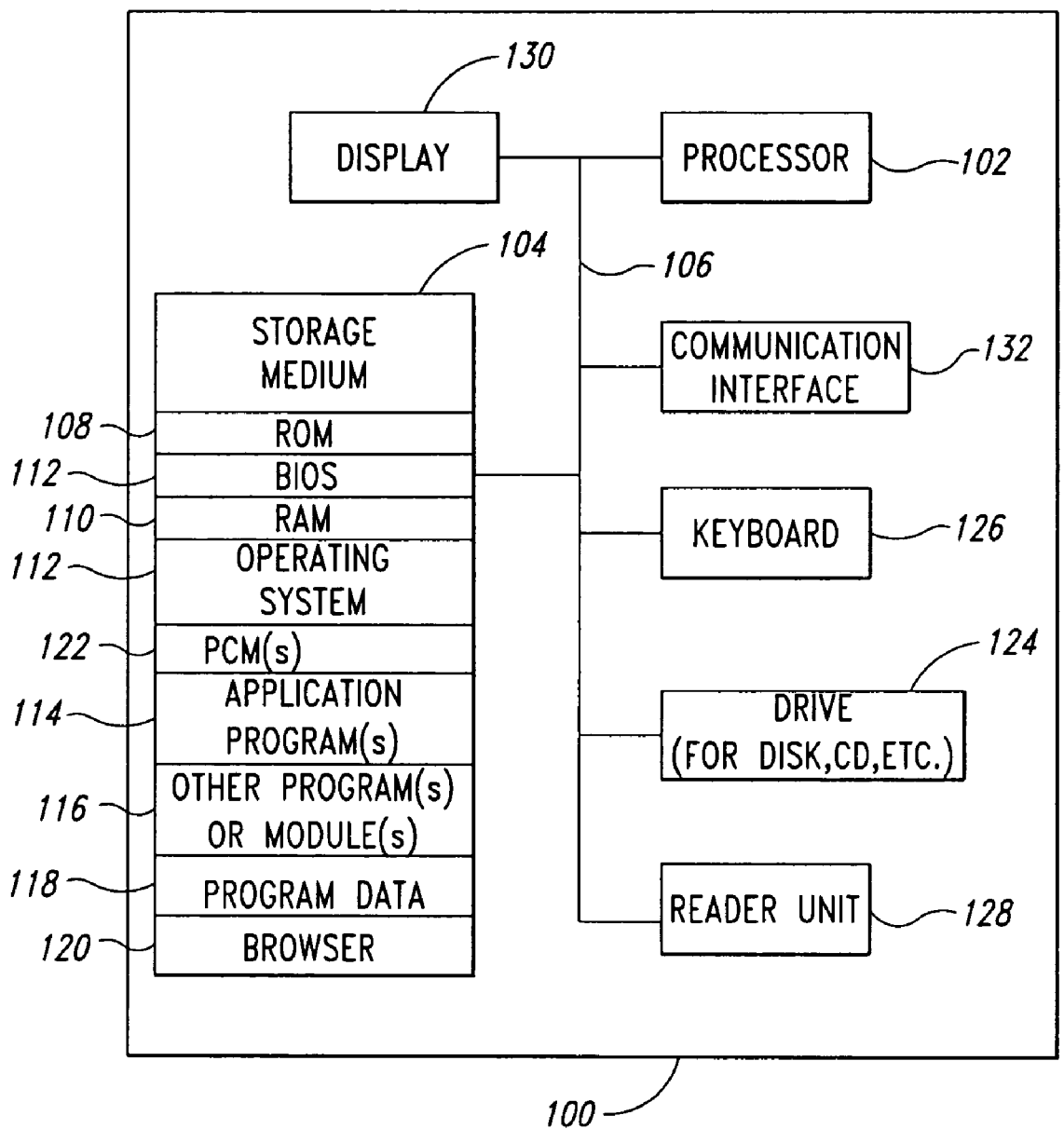
FIG. 1 is a block diagram of an embodiment of a device with which an embodiment may be implemented.

Embodiments of techniques for software loading into a device, such as a data collection device, are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment provides a technique to determine which particular software features should be installed in a device without having to rebuild the underlying operating system of the device each time a software feature has to be added, modified, updated, or removed. In one example implementation, the device is a data collection device, although it is appreciated that principles described herein may have application towards other types of devices that require customized software installs and which would benefit from not requiring a rebuild of their operating systems.

The device stores at least one product configuration matrix (PCM) that provides identification information, including which software features can be or should be installed in the device. In one embodiment, the product configuration matrix comprises an alphanumeric string, wherein at least some alphanumeric character(s) or group of characters correspond to a software feature that can be loaded into or otherwise installed into the device.

One or more externally stored configuration control files (CCF), in the form of text files, for example, are provided. The CCF can be stored at any suitable location, such as in a local file system or on a network (wired or wireless). The CCF can contain a description of most, if not all, of the software features that can be installed in any device. The description includes, for example, product configuration masks, identifications of external locations where software features (e.g., their code) can be obtained, and identifications of locations (e.g., registers) within the device where the software feature is to be loaded. As new features are created or as existing features are modified, the descriptions in the CCF can be updated as needed. Thus, the CCF can be roughly regarded as a type of "master list" of available software features.

During an installation process, the PCM is read from the device and compared with the product configuration masks in the CCF. When there is a match between one or more product configuration masks and the PCM, the software features corresponding to the matching product configuration masks are obtained (such as via network access) and loaded into the device. In an embodiment, the reading of the PCM, comparison between the PCM and the production configuration mask(s), and the obtaining and installation of the software feature(s) are performed during a boot sequence.

FIG. 1 is a block diagram of an embodiment of a device 100 with which an embodiment may be implemented. A non-limiting example of the device 100 is the CK30 mobile data collection terminal available from Internet Corporation of Everett, Wash. Embodiments are applicable to other devices, such as pocket personal computers (PCs), set top boxes, mobile electronic devices, and other consumer electronic devices.

The device 100 includes one or more processors 102, a machine-readable storage medium 104 (such as a system memory), and a system bus 106 that couples various system components, including the storage medium 104, to the processor 102. The processor 102 may be any logic processing unit, such as one or more central processing units (CPUs), digital signal processors (DSPs), application-specific integrated circuits (ASICs), etc.

The system bus 106 can employ any suitable bus structure or architecture, including a memory bus with memory controller, a peripheral bus, and a local bus. The storage medium 104 includes read-only memory (ROM) 108 and random access memory (RAM) 110. A basic input/output system (BIOS) 112, which can form part of the ROM 108, contains routines that help transfer information between components within the device 100, such as during start-up.

Program modules can be stored in the storage medium 104, such as an operating system 112, one or more application programs 114, other programs or modules 116, and program data 118. An example operating system 112 for the device 100 is Windows® CE, available from Microsoft Corporation of Redmond, Wash. In an embodiment, the operating system 112 can be customized for a particular type of device (sometimes referred to as a "platform") in which the operation system 112 is to be installed. In the context of Windows® CE, this customization is generally referred to as generating an operating system "image" for the platform.

The storage medium 104 may also store a browser 120 for permitting the device 100 to access and exchange data with sources such as web sites of the Internet, corporate intranets, or other networks as described below, as well as other server applications on server computers. The browser 120 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as NETSCAPE NAVIGATOR® from America Online, and INTERNET EXPLORER® available from Microsoft Corporation of Redmond, Wash. While shown in FIG. 1 as being stored in the storage medium 104, the operating system 112, application programs 114, other programs/modules 116, program data 118, browser 120, and/or other elements can be stored elsewhere in the device 100.

In an embodiment, the device 100 stores at least one product configuration matrix (PCM) 122. The PCM 122 can be stored in the storage medium 104 or elsewhere in the device 100. In an example implementation, the PCM 122 is stored in FLASH memory, and can be replaced or updated as needed by re-writing into the FLASH memory.

The PCM 122 of an embodiment comprises an alphanumeric string that contains identifying information associated with the device 100. For instance, the PCM 122 can comprise the following string: CK30CA1214001804. The first four characters (the characters "CK30") can identify the type of device 100. The subsequent alphanumeric characters can identify a version or model number, followed by identification of software features that can be configured in the device 100. As purely by way of example and illustration, the number "8" in the $14^{th}$ position in the alphanumeric string of the PCM 122 can indicate that the device 100 is to be configured with Japanese text/language user interface software. Other examples of software features include terminal emulation specifications, device driver types, user interface formats, and other features that would be familiar to a person skilled in the art having the benefit of this disclosure.

The individual characters and/or groups of characters in the alphanumeric string of the PCM 122 can, therefore, be used to identify certain software features that are supported by and can be loaded into each individual device 100, which may or may not be the same software features that are supported/loaded in other devices 100. The software features that are ultimately and actually loaded into the device 100 need not necessarily be the entire set of software features that are identified in the PCM 122—the software features can be selected to match the needs of a particular user.

The device 100 may include one or more drives 124 for reading from and writing to a storage unit, such as a floppy disk, compact disk (CD), magnetic cassette, flash memory card, digital video disk (DVD), Bernoulli cartridge, smart cards, and the like. The drive 124 communicates with the processor 102 via the system bus 106. The drive 124 may include interfaces or controllers (not shown) coupled between such drive(s) and the system bus 106. In one embodiment, the drive 124 and/or other drives are not integrated within a housing of the device 100 itself, but instead are external units that are accessible via hardwire or wireless communication interfaces.

A user can enter commands and information into the device 100 through input devices, such as a keyboard 126 (or other input device, such as a mouse, a touch pad, buttons, microphone, joystick, and the like). In an embodiment, the device 100 can include a reader unit 128 as another component to provide information to the device 100. An example of the reader unit 128 is a bar code scanner, an imager, and the like, which can be wireless-based, optical-based, RFID-based, and so forth. The device 100 can include a display 130, which is usable to display user interfaces, menus, graphics, and many types of data.

The device 100 can operate in a networked environment using logical connections to one or more remote computers and/or devices, such as servers, printers, external file systems, devices accessible via wireless or wired networks, and so on. A communication interface 132 is provided to facilitate communication with such devices. The communication interface 132 can comprise a modem, transceiver, Ethernet connection, serial or parallel port connection, Universal Serial Bus (USB) port, and so on.

Figure 2:
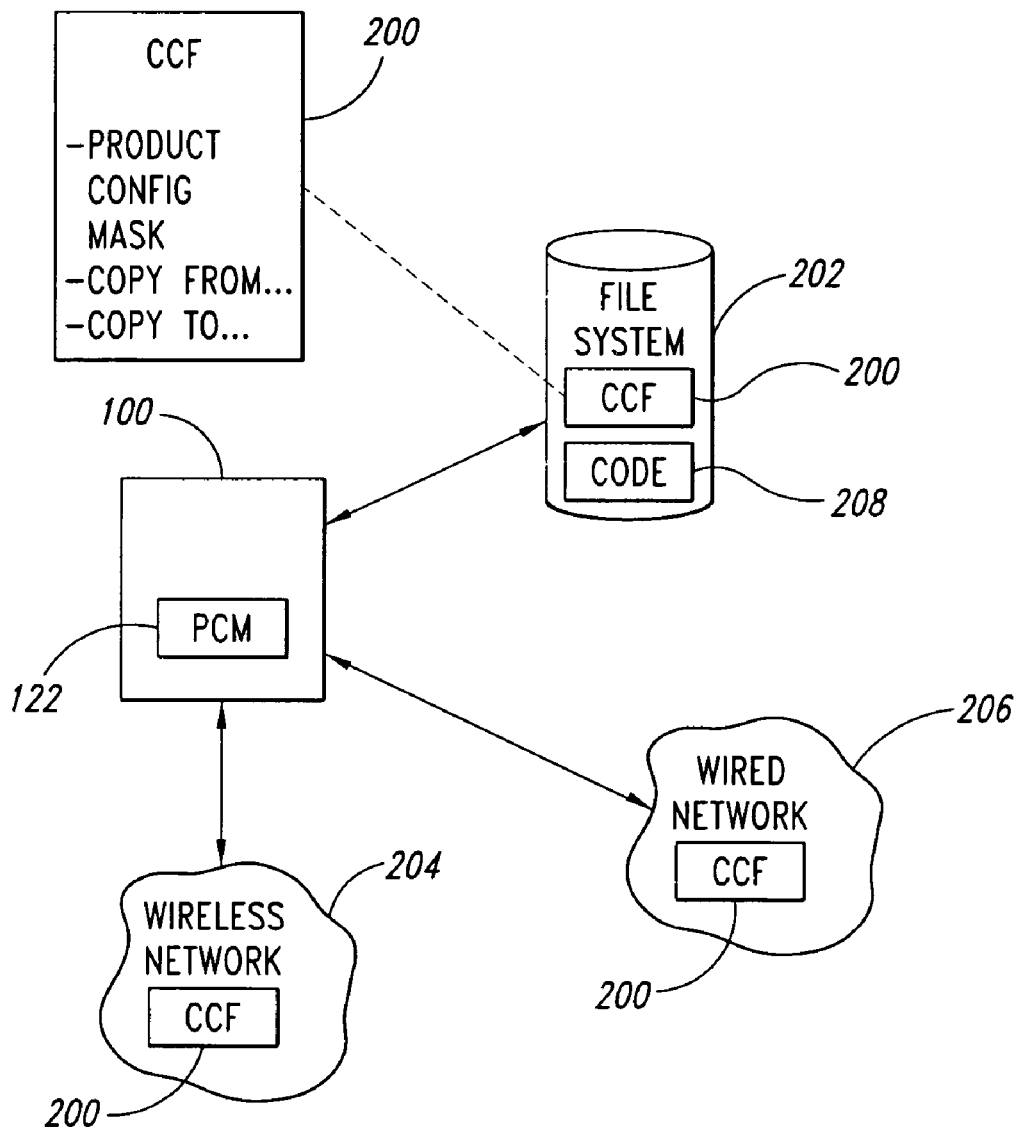
FIG. 2 is a block diagram depicting embodiments of various techniques to provide a configuration control file to the device of FIG. 1.

FIG. 2 is a block diagram depicting embodiments of various techniques to provide a configuration control file (CCF) 200 to the device 100 of FIG. 1. In an embodiment depicted in FIG. 2, the CCF 200 comprises a file that has the following format:

"product configuration mask", "copy from location", "copy to location".

The CCF 200 can be a text file or other file that includes this descriptive information related to software features that can be installed into devices 100. In particular, the product configuration mask appears as an alphanumeric string, such as the following: ****1********. The asterisks are ignored, but slots (or positions) in the product configuration mask that contain an alphanumeric character are compared against the PCM 122 of the device 100, such as the CK30CA1214001804 PCM from the example above. During the installation process when this comparison is performed, a matching "1" will be found in the seventh position in both the product configuration mask and in the PCM 122.

When a match is found, the "copy from location" field associated with that "1" in the seventh position is consulted to determine where to obtain the code for the corresponding software feature. The "copy to location" field specifies the register or other location in the device 100 where that code is to be loaded.

If a product configuration mask contains all asterisks, then the copy operation will always be performed (e.g., there is a match of all positions in the product configuration mask). Multiple positions in any given product configuration mask can be compared to the PCM 122 if the mask specifies more than one area. For instance, the product configuration mask ****C*1******* would also be considered a match with the example CK30CA1214001804 PCM, but the product configuration mask **A*1********* would not. In this illustration (assuming the "A" and "C" characters refer to a device version), therefore, the software feature associated with the character "1" for any device having a version "C" will be loaded into the device 100 (which is a CK30 device version "C" according to its PCM 122), instead of loading a software feature associated with the character "1" for a device version A.

There are many ways to organize the correlation between PCMs 122, CCFs 200, and product configuration masks. For example, a single CCF 200 can be created to apply to only a single individual or particular group of devices 100 (such as devices 100 for a particular corporate customer). A single CCF 200 can be created in a manner that it contains multiple product configuration masks that are applicable to either or both just an individual customer or multiple customers. Multiple CCFs 200 may also be applicable to any individual device 100. Using any of these techniques, it is thus possible, to allow customized download of software features into different devices 100, without requiring each and every device 100 to be loaded with all possible software features, of which some may be useless or irrelevant to some of the devices 100.

It is also possible to provide each CCF 200 with just one product configuration mask, rather than multiple masks. Multiple software features can be identified either or both by associating these software features to different positions in a single product configuration masks, by using multiple configuration masks that have different non-asterisk positions for the corresponding software features, or by using a combination thereof.

In FIG. 2, the CCFs 200 are depicted as residing in and accessible to the device 100 via a file system 202, a wireless network 204, a wired network 206, or any suitable combination thereof. The file system 202 can include a database, local storage, storage card, or other storage location that can be accessed by the device 100, such as by connecting the communication interface 132 of the device 100 to the file system 202. For instance, the device 100 can be docked or otherwise plugged into a terminal that provides access to the file system 200.

The networks 204-206 can include, but not be limited to, a local area network (LAN), a wide area network (WAN), or the Internet (e.g., Worldwide Web). Such networking environments are well known in wired and wireless enterprise-wide computer networks, intranets, extranets, and the Internet. Other embodiments include other types of communication networks including cellular networks, paging networks, mobile networks, or other communication networks that can use 802.11, GPS, Bluetooth, cellular (TDMA, FDMA, and/or CDMA), and/or other communication standards.

In addition to the CCFs 200, code 208 can be accessed from the file system 202, wireless network 204, and/or wired network 206. The code 208 comprises the underlying code, modules, subroutines, objects, or other machine-readable instructions of the various software features that can be loaded into devices 100 and that correspond to the description in the CCFs 200. The code 208 can comprise all or parts of the application programs 114, other programs or modules 116, and/or program data 118 shown in FIG. 1. Such code 208 is located and obtained via the "copy from location" information indicated in the CCFs 200 during the installation process when the PCM 122 is compared to the product configuration mask in the CCF 200. In one embodiment, the code 208 is in the form of cabinet (CAB) files or other suitable format that encapsulates or packages the code.

Figure 3:
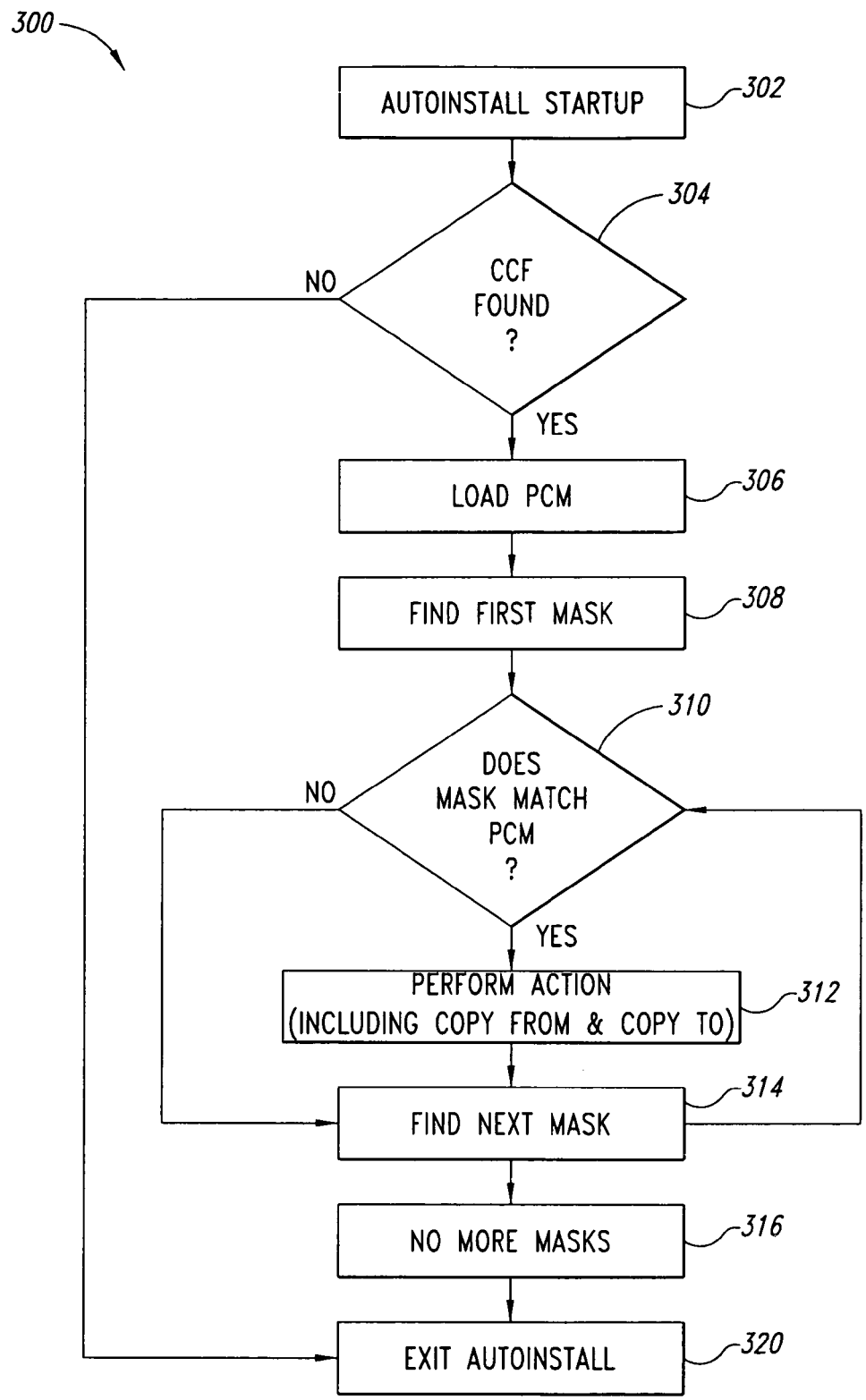
FIG. 3 is a flowchart of an embodiment of a technique to install software features into the device of FIG. 1.

FIG. 3 is a flowchart 300 of an embodiment of a technique to install software features into the device 100 of FIG. 1. At least some of the operations depicted in the flowchart 300 (and other flowcharts shown and described herein) may be embodied in software or other machine-readable instruction stored on a machine-readable medium. For example, the installation may be performed by software on the storage medium 104 during part of a boot sequence, as will be described in further detail with respect to FIG. 4. Alternatively or additionally, the installation may be performed by the device 100 outside of the boot sequence. In another embodiment, the installation may be performed by a machine that is external to the device 100, such as by a terminal to which the device 100 is docked during installation.

It is appreciated that the operations depicted in the flowchart 300 (as well as other flowcharts shown and described herein) need not necessarily occur in the exact order shown. Moreover, various operations may be added, removed, modified, or combined in other embodiments.

At a block 302, the installation process starts. In an embodiment, the installation process is referred to as an automatic install ("autoinstall") in that the installation can be performed automatically, such as during part of the boot sequence for the device 100, without user intervention.

At a block 304, the device 100 (or other machine performing the installation) searches for a CCF 200. Such searching can involve making connections to and querying the file system 202, wireless network 204, and/or wired network 206 for the presence of one or more CCFs 200. As discussed above, software upgrades or additions can be made available by updating the CCFs 200 (which can be thought of as a type of "master list"), storing the updated CCFs 200, and storing the code 208 that embodies the software upgrades/additions.

If no CCF 200 is found (or if no applicable CCF 200 is found), then the autoinstall process exits at a block 320, and the next process in the boot sequence is performed. Otherwise if an applicable CCF 200 is found at the block 304, then the PCM 122 is loaded or otherwise read from the device 100 at a block 306. During this reading, the alphanumeric string contained in the PCM 122 is obtained so that it can be compared with the product configuration mask(s) in the CCF 200.

At a block 308, the first product configuration mask is located or otherwise obtained from the CCF 200. As discussed above, there may be several possible ways to arrange product configuration masks and CCFs 200. For instance, a single CCF 200 may contain multiple product configuration masks, with different software features being identified in non-asterisk positions in multiple different product configuration masks. Alternatively or additionally, multiple software features may be identified in non-asterisk positions in individual product configuration masks. Thus, according to various possible embodiments that can be implemented, the searching for and comparing of masks depicted in the flowchart 300 can involve either or both comparison of the PCM 122 to multiple different product configuration masks contained in one or more CCFs 200, or comparison of each alphanumeric character of the PCM 122 to corresponding character positions in only one product configuration mask. A person skilled in the art having the benefit of this disclosure will realize that there are many ways to arrange the encoding of multiple or single masks (including hierarchical and dependent arrangements of masks and software features identified therein) in a manner to account for specific and/or general matches.

If there is no match between the PCM 122 and the current product configuration mask at a block 310, then the next mask is obtained for comparison at a block 314. If there is a match at the block 310, then the appropriate action is performed at a block 312 to load the corresponding software feature into the device 100.

According to an embodiment, the action(s) performed at the block 312 can include the following: parse through or otherwise read the CCF 200 to determine the location of the matching software feature(s) by examining the "copy from location" fields; connect to such locations (which may be in the file system 202, wireless network 204, wired network 206, or other location or combination thereof; download or otherwise obtain the code 208 from such location; and install the downloaded code into the device 100 by using the "copy to location" field in the CCF 200 to determine a register or other location in the device 100 where the code is to be installed.

In an embodiment, the "copying from" and "copying to" operations can involve the copying of CAB files that encapsulate or otherwise package the code 208. It is appreciated that other file formats and/or technique for information transfer may be used, alternatively or additionally to using CAB files.

At a block 316, no more masks are available for comparison. This result may occur, for instance, after all possible software features have been identified and installed, or if no matches have been found in any of the CCFs 200. At a block 320, the autoinstall process is exited. Upon exit of the autoinstall process, subsequent operations associated with the boot sequence can be performed and/or the device 100 is ready for use.

As discussed above, the autoinstall process depicted in FIG. 3 can be performed during the boot sequence for the device 100. Performing the installation during the boot sequence is advantageous in that doing so requires little, if any, human/user intervention in the installation and is automatic.

For purposes of illustration and explanation only, below is an example of a boot sequence for a device having Windows® CE as its operating system:

20—Device.exe

30—GWES.exe (depends on Device.exe being loaded and ready)

50—Explorer.exe (depends on Device.exe and GWES.exe being loaded and ready)

60—Services.exe (depends on Device.exe being loaded and ready).

In this example boot sequence, Device.exe loads the device drivers. GWES.exe loads the graphical and windowing event subsystems. Explorer.exe loads the user interface for the operating system shell, and services.exe is a process that supplements the Device.exe process. A person skilled in the art would be familiar with the features and operations associated with these individual executable processes in the boot sequence, and therefore, such processes will not be described in detail herein. It is appreciated that other types of operating systems may involve processes or executable files in their boot sequences that are not necessarily the same as depicted above—it is understood that embodiments can be provided wherein the autoinstall process can be implemented in these other types of operating systems.

Figure 4:
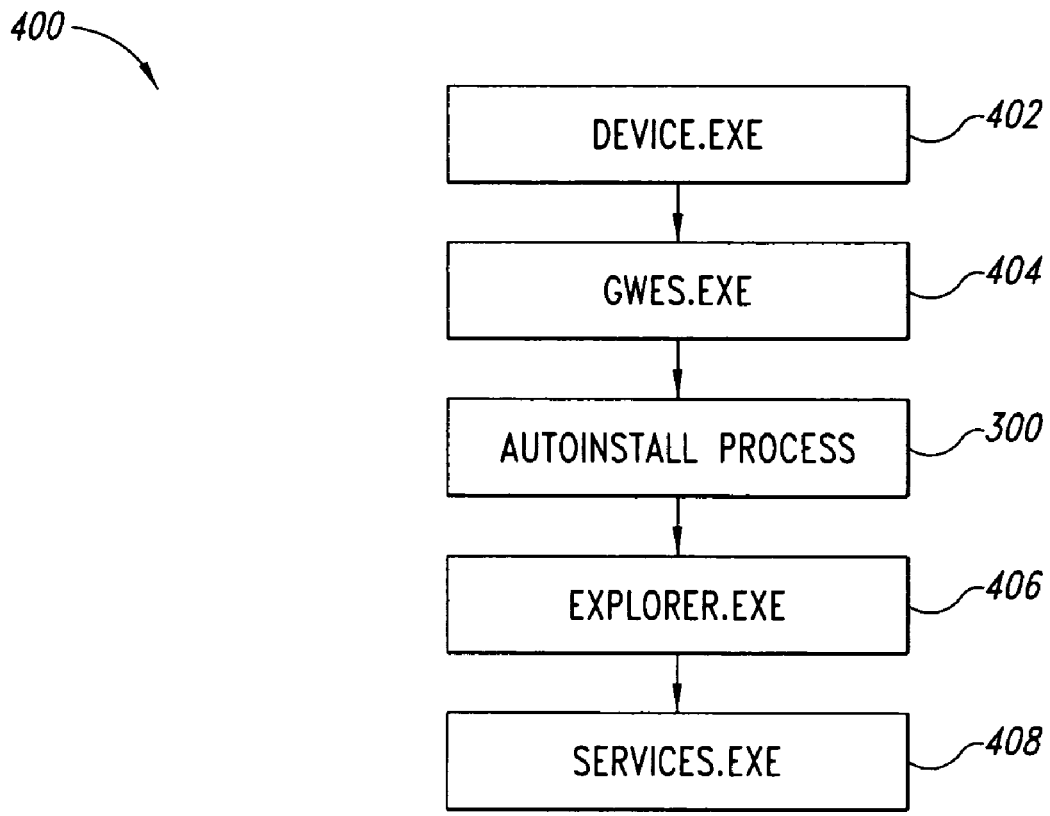
FIG. 4 is a flowchart of an embodiment of a boot sequence that includes the installation technique of FIG. 3.

FIG. 4 is a flowchart of an embodiment of a boot sequence 400 that includes the automatic installation process depicted by the flowchart 300 of FIG. 3. The boot sequence includes the Device.exe and GWES.exe (or similar executables) loading at blocks 402 and 404, respectively. The Explore.exe and Services.exe (or similar executables) are loaded at blocks 406 and 408, respectively. In one embodiment, the autoinstall process depicted by the flowchart 300 is performed subsequent to loading the GWES.exe at the block 404 and prior to loading the Explorer.exe at the block 406.

The autoinstall process is performed at this point in the boot sequence due to several reasons. First, the Device.exe loads the drivers and other components that are used for establishing and maintaining communications between the device 100 and external devices (such as the file system 202 and devices in the networks 204 and 206). These include drivers for modems, Ethernet cards, and the like. By having such communication-related drivers loaded into the device 100 and ready by the time the autoinstall process occurs, the autoinstall process can utilize such drivers to communicate with and download the code 208 from external locations.

Second, Explorer.exe runs terminal emulation processes or other processes related to the user interface(s) for the operating system 112 of the device 100. By performing the autoinstall process prior to loading Explorer.exe, the software features (such as terminal emulation) required by or used by Explorer.exe are guaranteed to be presently installed in the device 100 by the time Explorer.exe loads and runs at the block 406.

While the embodiment of FIG. 4 has been described with the autoinstall process occurring during a specific point in the boot sequence, it is appreciated that the autoinstall process may be performed, in other embodiments, at other points in a boot sequence. The specific points to perform the autoinstall process in the boot sequence can be varied based on several possible factors, including but not limited to, the types of software features that are expected to be loaded, the particular executable files that are loaded during the boot sequence, the dependencies among the executable files, and so forth. Moreover, other embodiments can be provided wherein the autoinstall process is performed outside of the boot sequence.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, while an embodiment has been described with respect to a device 100 that uses Microsoft Windows® CE as the operating system 112, it is appreciated that embodiments may be implemented in conjunction with other types of operating systems. Also, the boot sequence 400 may involve processes that are in addition or alternative to those depicted in FIG. 4—the autoinstall process may be implemented in such a boot sequence nevertheless.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method to install software features into an electronic device, the method comprising:
   storing at least one product configuration matrix (PCM) in the electronic device, the PCM including information representative of at least one software feature that can be installed in the electronic device;
   reading the PCM information;
   comparing the read PCM information with information from a configuration control file (CCF); and
   for a match between the PCM information and the CCF information, obtaining a software feature that corresponds to the match and installing that software feature into the electronic device,
   wherein said reading the PCM information includes reading an alphanumeric string,
   wherein said comparing the read PCM information with information from the CCF includes:
      comparing each position in the alphanumeric string with a corresponding position in a mask in the CCF; and
      for at least one position of the alphanumeric string that matches with a corresponding position in the mask, determining from the CCF a first location indicative of where a corresponding software feature is available and a second location in the electronic device where that software feature is to be installed, and
   wherein said obtaining and installing that software feature into the electronic device respectively include obtaining that software feature from the first location and installing the obtained software feature in the second location.

2. The method of claim 1 wherein said storing the PCM in the electronic device includes storing the PCM into a data collection device.

3. The method of claim 1 wherein at least some of the reading, comparing, obtaining, and installing is automatically performed during a boot sequence of the electronic device.

4. The method of claim 1 wherein said obtaining the software feature from the first location includes obtaining the software feature from at least one of a file system, wireless network, and wired network that are all remote from the electronic device.

5. The method of claim 1 wherein said comparing each position in the alphanumeric string with a corresponding position in a mask includes comparing each position in the alphanumeric string with corresponding positions in multiple masks.

6. The method of claim 1 wherein at least some of the storing, reading, comparing, obtaining, and installing is automatically performed during a boot sequence of the electronic device, subsequent to loading drivers of the electronic device and prior to loading a user interface of the operating system of the electronic device.

7. The method of claim 1 wherein said obtaining the software feature that corresponds to the match includes obtaining encapsulated code for the software feature.

8. The method of claim 1, further comprising either or both updating the CCF and generating additional CCFs if there are updates and additions to software features that can be installed in the electronic device.

9. The method of claim 1 wherein said storing the PCM in the electronic device includes storing the PCM in nonvolatile memory of the electronic device.

10. The method of claim 1, further comprising obtaining the CCF from at least one of a file system, wireless network, and wired network that are all remote from the electronic device.

11. The method of claim 1 wherein said installing the software feature in the electronic device includes installing the software feature without rebuilding an operating system image of the electronic device.

12. A method, comprising:
   storing a product configuration matrix (PCM) having information representative of at least one software feature that can be installed in an electronic device;
   storing an external configuration control file (CCF) having information indicative of software features that are available for loading into the electronic device;
   automatically comparing the PCM information and the CCF information to determine if there is at least one match between the PCM information and the CCF information; and
   receiving a software feature that corresponds to said at least one match between the PCM information and the CCF information, and automatically loading said received software feature into the electronic device,
   wherein said storing the CCF information includes;
   providing a mask having characters arranged in positions of an alphanumeric string, the string having a first type of alphanumeric character in positions in the string that are to be ignored during the comparing with the PCM information and having a second type of alphanumeric character, different from the first type of alphanumeric character, in positions in the string that are to be compared to determine said at least one match with corresponding positions in the PCM information;

specifying, for each of the position in said mask that have the second type of alphanumeric character, a location external to the electronic device where a corresponding software feature can be copied from; and specifying, for each of the positions in said mask that have the second type of alphanumeric character, a location in the electronic device where a corresponding software feature can be copied to.

13. The method of claim 12 wherein said storing the CCF information includes storing the CCF information in a file that is remote from the electronic device, including storing the file in at least one of a remote file system, wireless network, and wired network.

14. The method of claim 12, further comprising performing the automatic comparing and loading as part of a boot sequence for the electronic device.

15. The method of claim 12 wherein said loading the software feature into the electronic device includes loading said software feature into the electronic device without rebuilding an operating system image of the electronic device.

16. The method of claim 15, further comprising remotely obtaining code in encapsulated format that represents the software feature that is to be loaded into the electronic device.

17. An article of manufacture, comprising:
a memory having instructions stored thereon to cause a processor to install software features into an electronic device, by:
reading at least one product configuration matrix (PCM) stored in the electronic device, the PCM including information representative of at least one software feature that can be installed in the electronic device;
obtaining a configuration control file (CCF) remotely from the electronic device;
comparing the read PCM information with information from the obtained CCF;
identifying at least one match between the PCM information and the CCF information; and
obtaining a software feature that corresponds to the match and loading that software feature into the electronic device,
wherein the instructions to read the PCM information includes instructions to read an alphanumeric string,
wherein the instructions to compare the read PCM information with information from the CCF includes instructions to:
compare each position in the alphanumeric string with a corresponding position in a mask in the CCF; and
for at least one position of the alphanumeric string that matches with a corresponding position in the mask, determine from the CCF a first location indicative of where a corresponding software feature is available and a second location in the electronic device where that software feature is to be installed, and
wherein the instructions to obtain the software feature that corresponds to the match and to load that software feature into the electronic device include instructions to obtain that software feature from the first location and install the obtained software feature in the second location.

18. The article of manufacture of claim 17 wherein at least some of the instructions to store, read, obtain the CCF, compare, identify, and obtain the software feature, and install include instructions to automatically perform at least some of these during a boot sequence of the electronic device.

19. A system, comprising:
a means for storing a product configuration matrix (PCM) having information representative of at least one software feature that can be installed in an electronic device, wherein said PCM information includes an alphanumeric string;
a means for storing, as a configuration control file (CCF), CCF information indicative of software features that are available for loading into the electronic device;
a means for automatically comparing the PCM information and the CCF information to determine if there is at least one match between the PCM information and the CCF information; and
a means for receiving a software features that corresponds to said at least one match between the PCM information and the CCF information, and for automatically loading said received feature into the electronic device,
wherein said means for automatically comparing the PCM information and the CCF information:
compares each position in the alphanumeric string with a corresponding position in a mask in the CCF;
for at least one position of the alphanumeric string that matches with a corresponding position in the mask, determines from the CCF a first location indicative of where a corresponding configuration feature is available and a second location in the electronic device where that configuration features is to be installed; and
wherein said means for automatically loading obtain that configuration feature from the first location and installs the obtained configuration feature in the second location.

20. The system of claim 19 wherein said means for storing said CCF information includes means for remotely storing either or both the CCF and the available software features remotely from the electronic device.

21. The system of claim 19 wherein said means for automatically comparing and said means for automatically loading respectively perform at least some of the automatic comparing and loading during a boot sequence of the electronic device.

22. The system of claim 19, further comprising means for extending and adapting the CCF to allow additional software features to be automatically installed in the electronic device after other software features have been previously loaded and without requiring a rebuild of an operating system of the electronic device.

23. The system of claim 19, further comprising means present in the electronic device for supporting operation of the electronic device.

24. An apparatus, comprising:
an operating system of an electronic device;
a product configuration matrix (PCM) having information representative of at least one software feature that can be installed in the electronic device and to be compared with information from an external configuration control file (CCF) to determine if there is at least one match between the PCM information and the CCF information;
a communication interface through which to receive a software feature that corresponds to said at least one match between the PCM information and the CCF information; and
a storage medium in which to automatically install the received software feature, the software feature being automatically installed in the storage medium substantially without rebuild of the operating system, wherein said CCF includes a mask having characters arranged in positions of an alphanumeric string, the string having a first type of alphanumeric character in positions in the string that are to be ignored during the comparison with the PCM information and having a second type of alphanumeric character, different from the first type of alphanumeric character, in positions in the string that are to be compared to determine said at least one match with corresponding positions in the PCM information, wherein, for each of the positions in said mask that have the second type of alphanumeric character, a location external to the electronic device is specified where a corresponding software feature can be copied from, and wherein, for each of the positions in said mask that have the second type of alphanumeric character, a location in the electronic device is specified where said corresponding software feature can be copied to.

25. The apparatus of claim 24 wherein the electronic device can perform a boot sequence, wherein at least some of the comparison of PCM and CCF information, reception of the software feature, and automatic installation of the software feature can be performed during the boot sequence.

26. The apparatus of claim 24 wherein the PCM is stored in a nonvolatile memory location of the electronic device.

27. The apparatus of claim 24 wherein the PCM includes an alphanumeric string.

28. The apparatus of claim 24 wherein the communication interface can obtain either or both the CCF and software feature from at least one of a remote file system, wireless network, and wired network.

29. The apparatus of claim 24 wherein the electronic device includes a data collection device.

* * * * *